US010846661B2

(12) United States Patent
Tang et al.

(10) Patent No.: US 10,846,661 B2
(45) Date of Patent: *Nov. 24, 2020

(54) VISUALIZING VEHICLE CONDITION USING EXTENDED REALITY

(71) Applicant: Capital One Services, LLC, McLean, VA (US)

(72) Inventors: Qiaochu Tang, The Colony, TX (US); Micah Price, Anna, TX (US); Jason Hoover, Grapevine, TX (US); Stephen Wylie, Carrollton, TX (US); Geoffrey Dagley, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,244

(22) Filed: Jul. 30, 2019

(65) Prior Publication Data

US 2020/0334643 A1    Oct. 22, 2020

Related U.S. Application Data

(63) Continuation of application No. 16/387,170, filed on Apr. 17, 2019, now Pat. No. 10,410,182.

(51) Int. Cl.
*G09G 5/00* (2006.01)
*G06Q 10/00* (2012.01)
(Continued)

(52) U.S. Cl.
CPC ......... *G06Q 10/20* (2013.01); *G06K 9/00671* (2013.01); *G06T 7/70* (2017.01);
(Continued)

(58) Field of Classification Search
CPC .. G06K 9/00664–00704; G06F 3/0481; G06F 3/04817; G06F 9/4443;
(Continued)

(56) References Cited

U.S. PATENT DOCUMENTS 10,140,773 B2 * 11/2018 Short ................... G06T 19/006
10,380,696 B1 *  8/2019 Haller, Jr. .............. G06Q 40/08
(Continued)

OTHER PUBLICATIONS

Co-pending U.S. Appl. No. 16/387,170, filed Apr. 17, 2019.
(Continued)

*Primary Examiner* — Todd Buttram
(74) *Attorney, Agent, or Firm* — Harrity & Harrity, LLP

(57) ABSTRACT

Various aspects described herein generally relate to visualizing a vehicle history using extended reality. In some implementations, an extended reality device may obtain image data corresponding to one or more vehicle parts that are visible in a field of view of the extended reality device. The extended reality device may identify one or more anchor points in a coordinate space corresponding to the field of view of the extended reality device and obtain a vehicle history report based on an identifier associated with the vehicle. The extended reality device may obtain digital content based on one or more records contained in the vehicle history report and an expected visual appearance of the one or more parts of the vehicle. The extended reality device may render the digital content on a display of the extended reality device. Various other aspects are provided.

20 Claims, 9 Drawing Sheets

(51) Int. Cl.
*G06K 9/00* (2006.01)
*G06T 7/70* (2017.01)
*G07C 5/08* (2006.01)
*G07C 5/00* (2006.01)

(52) U.S. Cl.
CPC ............ *G07C 5/006* (2013.01); *G07C 5/085* (2013.01); *G06T 2207/20081* (2013.01); *G06T 2207/30252* (2013.01)

(58) Field of Classification Search
CPC ............ G06F 3/04847; G06F 11/3664; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | | |
|---|---|---|---|---|
| 10,410,182 | B1* | 9/2019 | Tang | G07C 5/006 |
| 10,452,915 | B1* | 10/2019 | Chikkaveerappa | G07C 5/085 |
| 2012/0050144 | A1* | 3/2012 | Morlock | G06T 19/006 |
| | | | | 345/8 |
| 2012/0230548 | A1 | 9/2012 | Calman et al. | |
| 2015/0046363 | A1* | 2/2015 | McNamara | G06Q 10/0635 |
| | | | | 705/333 |
| 2016/0005233 | A1* | 1/2016 | Fraccaroli | G02B 27/0172 |
| | | | | 345/633 |
| 2016/0140703 | A1* | 5/2016 | Kim | G06T 7/001 |
| | | | | 382/104 |
| 2017/0061459 | A1 | 3/2017 | Dow et al. | |
| 2017/0061506 | A1 | 3/2017 | Dow et al. | |
| 2017/0124776 | A1 | 5/2017 | Carpentier et al. | |
| 2017/0147991 | A1 | 5/2017 | Franke et al. | |
| 2017/0286888 | A1* | 10/2017 | Merg | G06Q 10/06311 |
| 2017/0308751 | A1 | 10/2017 | Kim et al. | |
| 2018/0300551 | A1* | 10/2018 | Luccin | G06K 9/00201 |
| 2018/0349699 | A1* | 12/2018 | O'Connell | G06K 9/00671 |
| 2019/0095963 | A1* | 3/2019 | Martin | G06Q 30/0278 |

OTHER PUBLICATIONS

Volkswagen, "Virtual Technologies", Oct. 26, 2018, 4 pages, Retrieved from [https://www.volkswagenag.com/en/group/research/virtual-technologies.html].

* cited by examiner

VISUALIZING VEHICLE CONDITION USING EXTENDED REALITY

CROSS-REFERENCE TO RELATED APPLICATION

This application is a continuation of U.S. patent application Ser. No. 16/387,170, filed on Apr. 17, 2019, the content of which is incorporated by reference herein in its entirety.

BACKGROUND

"Extended reality" (XR) is an umbrella term that encompasses augmented reality (AR), mixed reality (MR), virtual reality (VR), and everything in between. For example, augmented reality generally refers to interactive technologies in which objects in a real-world environment are "augmented" using computer-generated virtual content that may be overlaid on the real-world environment. "Mixed reality," sometimes referred to as "hybrid reality," similarly merges real and virtual worlds to produce a visual environment in which real physical objects and virtual digital objects can co-exist. However, in addition to overlaying virtual objects on the real-world environment, mixed reality applications often anchor the virtual objects to the real-world and allow users to interact with the virtual objects. "Virtual reality" refers to fully immersive computer-generated experiences that take place in a simulated environment, often incorporating auditory, visual, haptic, and/or other feedback mechanisms.

SUMMARY

According to some implementations, a method may include obtaining image data corresponding to one or more parts of a vehicle that are visible in a field of view of an extended reality device; identifying one or more anchor points in a coordinate space corresponding to the field of view of the extended reality device, wherein the one or more anchor points correspond to the one or more parts of the vehicle in the coordinate space corresponding to the field of view of the extended reality device; obtaining a vehicle history report associated with the vehicle based on an identifier associated with the vehicle; obtaining digital content based on one or more records contained in the vehicle history report and an expected visual appearance of the one or more parts of the vehicle, wherein the one or more records relate to one or more repair or maintenance incidents involving the one or more parts of the vehicle; and rendering the digital content on a display of the extended reality device, wherein rendering the digital content comprises placing the digital content in the coordinate space using the one or more anchor points that correspond to the one or more parts of the vehicle.

According to some implementations, an extended reality device may comprise a memory and one or more processors operatively coupled to the memory. The memory and the one or more processors may be configured to obtain image data corresponding to one or more parts of a vehicle that are visible in a field of view of the extended reality device; identify one or more anchor points in a coordinate space corresponding to the field of view of the extended reality device, wherein the one or more anchor points correspond to the one or more parts of the vehicle in the coordinate space corresponding to the field of view of the extended reality device; obtain, from one or more machine learning models, an output that provides a representation of an expected visual appearance of the one or more parts of the vehicle; identify, based on the image data and the representation provided by the output from the one or more machine learning models, at least one discrepancy between an actual visual appearance of the one or more parts of the vehicle and the expected visual appearance of the one or more parts of the vehicle; obtain digital content based on the at least one discrepancy; and render the digital content on a display of the extended reality device, wherein the one or more processors, when rendering the digital content, are further configured to place the digital content in the coordinate space using the one or more anchor points that correspond to the one or more parts of the vehicle.

According to some implementations, a non-transitory computer-readable medium may store one or more instructions. The one or more instructions, when executed by one or more processors of an extended reality device, may cause the one or more processors to obtain image data corresponding to a set of parts of a vehicle visible in a field of view of the extended reality device; identify one or more anchor points in a coordinate space corresponding to the field of view of the extended reality device, wherein the one or more anchor points correspond to the set of parts of the vehicle in the coordinate space corresponding to the field of view of the extended reality device; determine, based on the image data, that the set of parts includes a first part and a second part that appears to be newer than the first part; and render, on a display of the extended reality device, digital content to visually indicate that the second part appears to be newer than the first part, wherein the one or more instructions that cause the one or more processors to render the digital content further cause the one or more processors to place the digital content in the coordinate space using the one or more anchor points that correspond to the second part.

DETAILED DESCRIPTION

Figure 1A:
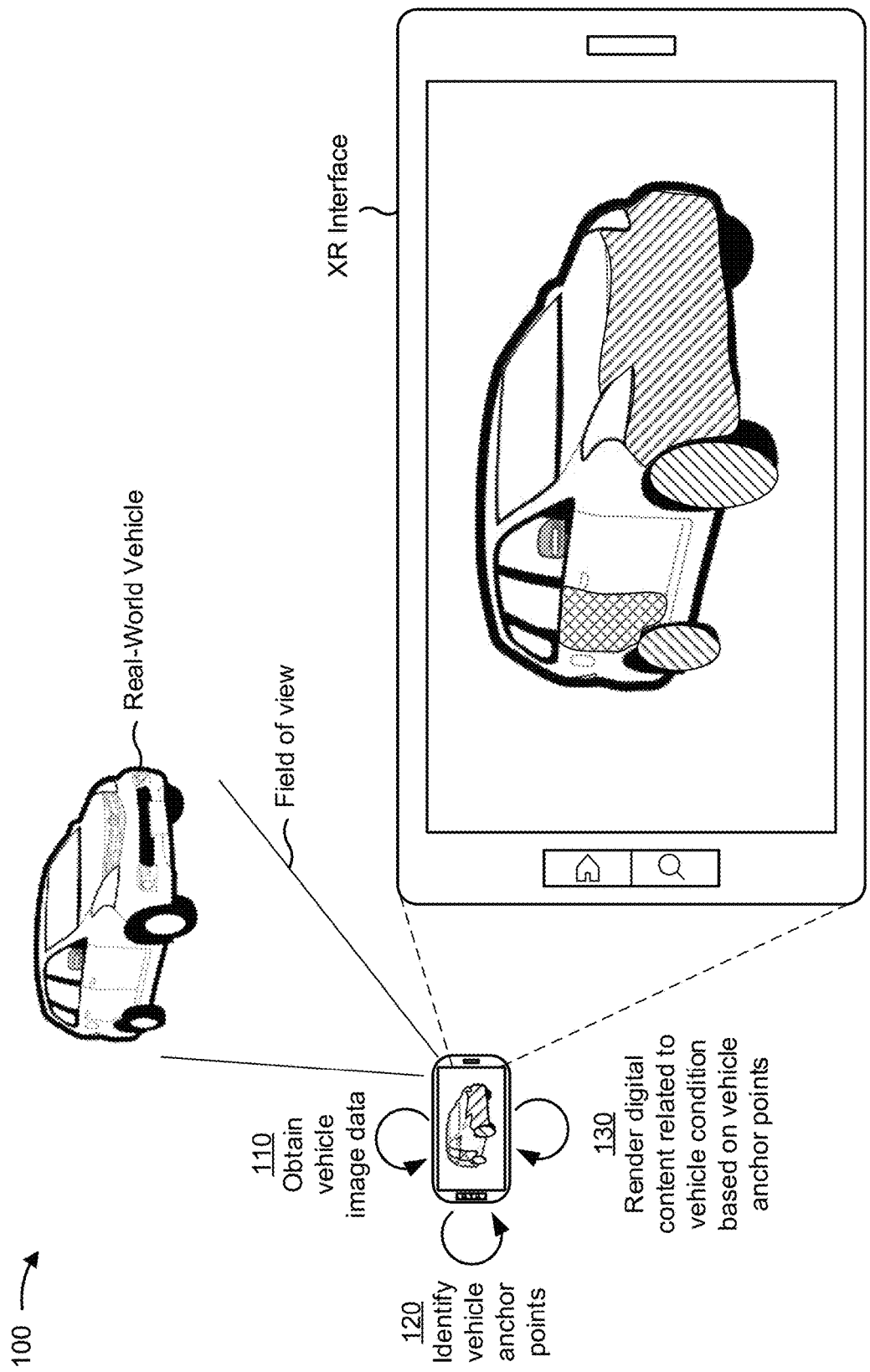
FIGS. 1A-1D are diagrams of one or more example implementations described herein.

The following detailed description of example implementations refers to the accompanying drawings. The same reference numbers in different drawings may identify the same or similar elements.

Prior to entering into a transaction for a used vehicle, a potential purchaser may wish to know a condition of the vehicle in order to make an informed decision regarding whether to purchase the vehicle, how much to pay for the vehicle, and/or the like. For example, the potential purchaser may obtain a vehicle history report that includes details relating to various items of public record, such as vehicle ownership history, accident history, odometer readings, title status (e.g., whether the vehicle has been written off as a total loss due to a collision, a fire, a flood, and/or the like causing damage in excess of the vehicle's value), past registration as a fleet vehicle, manufacturer or lemon law buybacks, and/or the like. While the vehicle history report can contain useful information to evaluate a track record for a used vehicle, in many cases the vehicle history report may be incomplete, inaccurate, and/or difficult to decipher.

More particularly, the vehicle history report is based only on information that is actually supplied to a vehicle history provider, meaning that certain information (including potential problems) that are not reported to the vehicle history provider will not be included in the vehicle history report. For example, a vehicle could be involved in a major collision, rebuilt, and sold before a database used by the vehicle history provider is updated to include notice of the collision or the subsequent repairs. In another example, certain repairs may have been carried out by an independent mechanic that did not report the repairs and/or reported the repairs only to a source inaccessible to the vehicle history provider. Furthermore, because vehicle history databases typically include information from a wide range of reporting sources (e.g., insurance companies, motor vehicle agencies, collision repair facilities, service and/or maintenance facilities, state inspection stations, manufacturers, law enforcement agencies, and/or the like), vehicle history reports may include mistakes, inconsistencies, or otherwise inaccurate data.

Moreover, even when the vehicle history report is reasonably accurate and/or current, the vehicle history report may still be convoluted and/or unclear. For example, vehicle history reports are often replete with jargon that may be difficult to decipher for an individual without extensive automobile experience. While some vehicle history reports include summary sections to emphasize certain details in the vehicle history (e.g., red flags such as open recalls, a branded title, and/or the like), potential purchasers may have different opinions regarding which issues are most important in the vehicle history. The vehicle history report also tends to be extensive, often containing hundreds or more records, which may result in the potential purchaser having difficulty picking out important details and/or missing crucial details. Furthermore, because the records contained the vehicle history report are based only on events that are reported to a vehicle history provider, the vehicle history report will not include information relating to the mechanical condition of the vehicle, whether certain parts are worn, whether the vehicle model includes certain components prone to early failure, and/or the like.

Some implementations described herein may utilize a device having extended reality capabilities (e.g., a virtual reality device, an augmented reality device, a mixed reality device, and/or the like) to render digital content to visualize information related to a condition of a real-world vehicle based on one or more images of the real-world vehicle. For example, based on the one or more images, the device may identify one or more parts of the vehicle (e.g., front bumper, rear bumper, driver-side door(s), passenger-side door(s), tires, hood, and/or the like) and use the one or more parts as anchor points to place the digital content, which may comprise a patterned overlay, a colored overlay, a hologram, a digital or virtual object, a text box, a visual marker, superimposed graphics, and/or the like. In some implementations, the digital content may visualize information related to one or more incidents detailed in a vehicle history report, which may be obtained based on an identifier associated with the vehicle (e.g., a vehicle identification number (VIN), a license plate number, and/or the like). For example, the vehicle history report may include one or more records related to a collision involving a rear passenger-side bumper, in which case the digital content may include an overlay placed on the rear passenger-side bumper, text hovering over the rear passenger-side bumper to indicate where the collision occurred, and/or the like.

Furthermore, in some implementations, one or more artificial intelligence techniques, such as machine learning, deep learning, and/or the like, may be used to perform a visual inspection of the vehicle and render digital content accordingly. For example, one or more data models (e.g., machine learning models) may provide a representation of an expected visual appearance of one or more parts of the vehicle (e.g., when the one or more parts are new, after a certain level of wear-and-tear, and/or the like) and the one or more artificial intelligence techniques may be used to identify, based on the one or more images, one or more discrepancies between an actual visual appearance and the expected visual appearance of the one or more parts. Additionally, or alternatively, the one or more artificial intelligence techniques may be used to identify, based on the one or more images, one or more discrepancies between the actual visual appearance of different parts, which may indicate relative conditions of the different parts (e.g., where an engine bay includes various parts that have dust and debris built up over time from normal driving and one particular part, such as a battery, has significantly less dust and debris, this may indicate that the one particular part is newer than the various other parts).

In this way, the digital content may provide an extended reality (e.g., virtual reality, augmented reality, mixed reality, and/or the like) visual representation that converts text-based records contained in a vehicle history report into digital content that can be overlaid on one or more images of a vehicle in order to emphasize relevant information contained in the vehicle history report, whereas conventional vehicle history reports are typically limited to text-based records that fail to provide any way to visualize the details of the reported events with reference to the associated vehicle. Furthermore, by using the one or more artificial intelligence techniques to detect issues related to the condition of the vehicle (e.g., using computer vision based on visible features of the vehicle), the extended reality visual representation may emphasize one or more potential issues related to the condition of the vehicle that may not be listed in the vehicle history report, indicate discrepancies between the vehicle history report and the actual condition of the vehicle (e.g., repairs that may have been reported but not completed or performed at a substandard level), and/or the like. In this way, the extended reality visual representation may provide a potential purchaser with more information than is otherwise available in a standard vehicle history report in addition to providing the potential purchaser with a visual tool to evaluate the information contained in the vehicle history report. In other words, implementations described herein may use a device having extended reality capabilities to ingest data from a vehicle history report, on-board diagnostics data reported by a vehicle, data related to a visual appearance of the vehicle, and/or the like and produce an extended reality experience that provides comprehensive detail related to the condition of the vehicle. Furthermore, this may also allow the potential purchaser to make an informed decision regarding whether to purchase the vehicle, how much to offer for the vehicle, and/or the like.

FIGS. 1A-1D are diagrams of one or more example implementations 100 described herein. In the following description, implementation(s) 100 may be described in a context that relates to visualizing information related to a vehicle history or a vehicle condition using a device having extended reality capabilities. However, it will be appreciated that this description is for illustration purposes only, and that the techniques described herein may be used to visualize information related to a history or condition of any suitable object (e.g., a house or other real estate, furniture, jewelry, electronic equipment, musical instrument, and/or the like).

As shown in FIG. 1A, and by reference number 110, an extended reality device may obtain image data corresponding to a real-world vehicle. For example, in some implementations, the extended reality device may be an augmented reality or mixed reality device (e.g., a smartphone, a tablet, an optical see-through display, a video see-through display, a holographic display, a heads-up display, and/or the like), a virtual reality device (e.g., a virtual reality headset or head-mounted display), and/or the like. In some implementations, the image data may be obtained by positioning the real-world vehicle within a field of view of one or more sensors of the extended reality device. For example, the one or more sensors may include a camera, an image sensor, an infrared camera, a laser sensor, and/or any other suitable sensor(s) that can capture one or more images and/or data related to physical attributes of the real-world vehicle. Additionally, or alternatively, the image data may be obtained from one or more frames in a video feed of the real-world vehicle, a three-dimensional model that represents various surfaces of the real-world vehicle, and/or the like. In general, the image data may be used to identify one or more parts of the real-world vehicle, determine a condition of the one or more parts, visualize information related to the condition of the one or more parts, and/or the like, as described elsewhere herein.

As further shown in FIG. 1A, and by reference number 120, the extended reality device may identify one or more anchor points for rendering digital content based on the image data corresponding to the real-world vehicle. More particularly, the extended reality device may have or otherwise be associated with a coordinate space that corresponds to the field of view of the extended reality device, and digital content (e.g., virtual objects) may be rendered within the coordinate space according to a pose of the extended reality device. For example, the pose of the extended reality device may be expressed according to six degrees of freedom, which include a three-dimensional position of the extended reality device combined with pitch, roll, and yaw representing an orientation through rotation about three perpendicular axes. Accordingly, the one or more anchor points may represent a relative position and orientation of one or more corresponding points in the field of view of the extended reality device for a particular frame, and a pose of the one or more anchor points within the coordinate space may be automatically updated based on changes to the pose of the extended reality device.

In some implementations, the one or more anchor points may be identified based on one or more parts of the real-world vehicle that are depicted in the image data. Accordingly, the extended reality device may be configured to use one or more artificial intelligence techniques, such as machine learning, deep learning, and/or the like, to identify the one or more parts of the real-world vehicle that are depicted in the image data. For example, in some implementations, the one or more artificial intelligence techniques may include a computer vision technique, such as a convolutional neural network technique, to assist in classifying the image data (e.g., data relating to distinctive feature points in the image data) into a particular class (e.g., a class indicating that the feature points share a planar surface and therefore belong to a common part). In some cases, the computer vision technique may identify the one or more parts depicted in the image data using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), an image segmentation technique, and/or the like. For example, in some implementations, the extended reality device may partition one or more digital images into multiple segments that include various pixels, super-pixels, and/or the like, which can be used to locate objects and boundaries (e.g., lines, curves, etc.) in the digital image(s). The extended reality device may assign a label to each pixel such that pixels with the same label may share certain characteristics (e.g., belonging to the same part of the vehicle). Additionally, or alternatively, the extended reality device may use an edge detection technique to identify points in the digital image(s) at which brightness changes sharply or has discontinuities, which may indicate shapes, boundaries, and/or the like for different parts of the vehicle.

Accordingly, using the one or more artificial intelligence techniques, the extended reality device may identify one or more parts of the real-world vehicle based on the image data corresponding to the real-world vehicle. For example, as shown in FIG. 1A, the parts of the vehicle depicted in the image data include a front bumper, front headlights, a hood, a windshield, a fender, passenger-side tires, passenger-side doors, a passenger-side mirror, a gas cap, a quarter panel, and/or the like. Furthermore, using the one or more artificial intelligence techniques, the extended reality device may identify any suitable interior and/or exterior part of the real-world vehicle. For example, the hood of the vehicle may be opened to reveal an engine bay, and the extended reality device may analyze image data corresponding to the engine bay to identify an intake manifold, a battery, an alternator, various fluid compartments, and/or the like. In another example, image data may be obtained from within the vehicle, and the extended reality device may analyze the image data to identify an instrument panel, an infotainment system, floor pedals, a steering wheel, a glove compartment, and/or the like. In some implementations, the extended reality device may obtain one or more models of the real-world vehicle (e.g., schematics based on a make, model, and year of the vehicle), which may be used to identify the one or more parts of the vehicle using the one or more artificial intelligence techniques.

As further shown in FIG. 1A, and by reference number 130, the extended reality device may render digital content related to a condition of the real-world vehicle on a display of the extended reality device (e.g., in an extended reality interface). For example, as mentioned above, the extended reality device may identify the one or more anchor points to represent the one or more parts of the real-world vehicle depicted in the image data as trackable objects in the coordinate space corresponding to the field of view of the extended reality device. Accordingly, when rendering the digital content related to the condition of the real-world vehicle, the digital content may be placed within the coordinate space using the one or more anchor points that correspond to the one or more parts of the vehicle. In this way, when the pose of the extended reality changes, the relative position and orientation of the one or more anchor points may remain fixed to the one or more parts. For example, as shown in FIG. 1A, the digital content includes a first patterned overlay placed on the front bumper, a second patterned overlay placed on the passenger-side tires, and a third patterned overlay placed on the rear passenger-side door. Additionally, or alternatively, the digital content may include colored overlays, holograms, digital or virtual objects, textual descriptions (e.g., within a billboard or text box), visual markers, superimposed graphics, and/or the like.

In some implementations, as described in further detail below, the digital content may be based on information contained in a vehicle history report associated with the real-world vehicle, diagnostic data related to a condition of the vehicle, an analysis of the image data associated with the real-world vehicle, and/or the like. For example, the digital content rendered on the display of the extended reality device may be based on information contained in a vehicle history report as will be described in further detail below with reference to FIG. 1B, diagnostic data related to a condition of the vehicle as will be described in further detail below with reference to FIG. 1C, and/or an analysis of the image data associated with the real-world vehicle as will be described in further detail below with reference to FIG. 1D. The extended reality device may evaluate all the information that is known about the vehicle and render digital content that provides the potential purchaser with a recommendation as to whether to purchase the vehicle, an amount to offer for the vehicle, and/or the like. For example, in some implementations, the information contained in the vehicle history report, the diagnostic data related to the condition of the vehicle, information related to the analysis of the image data, and/or other suitable data may be input to one or more machine learning models, which may output information used to make a purchase recommendation, a recommended offer amount, and/or the like. Moreover, the extended reality device may ingest the information contained in the vehicle history report, the diagnostic data related to the condition of the vehicle, and/or information related to the condition of the vehicle based on an analysis of the image data associated with the real-world vehicle and render the digital content in such a way that provides a comprehensive representation of the condition of the vehicle based on the information obtained through these various sources in combination.

Figure 1B:
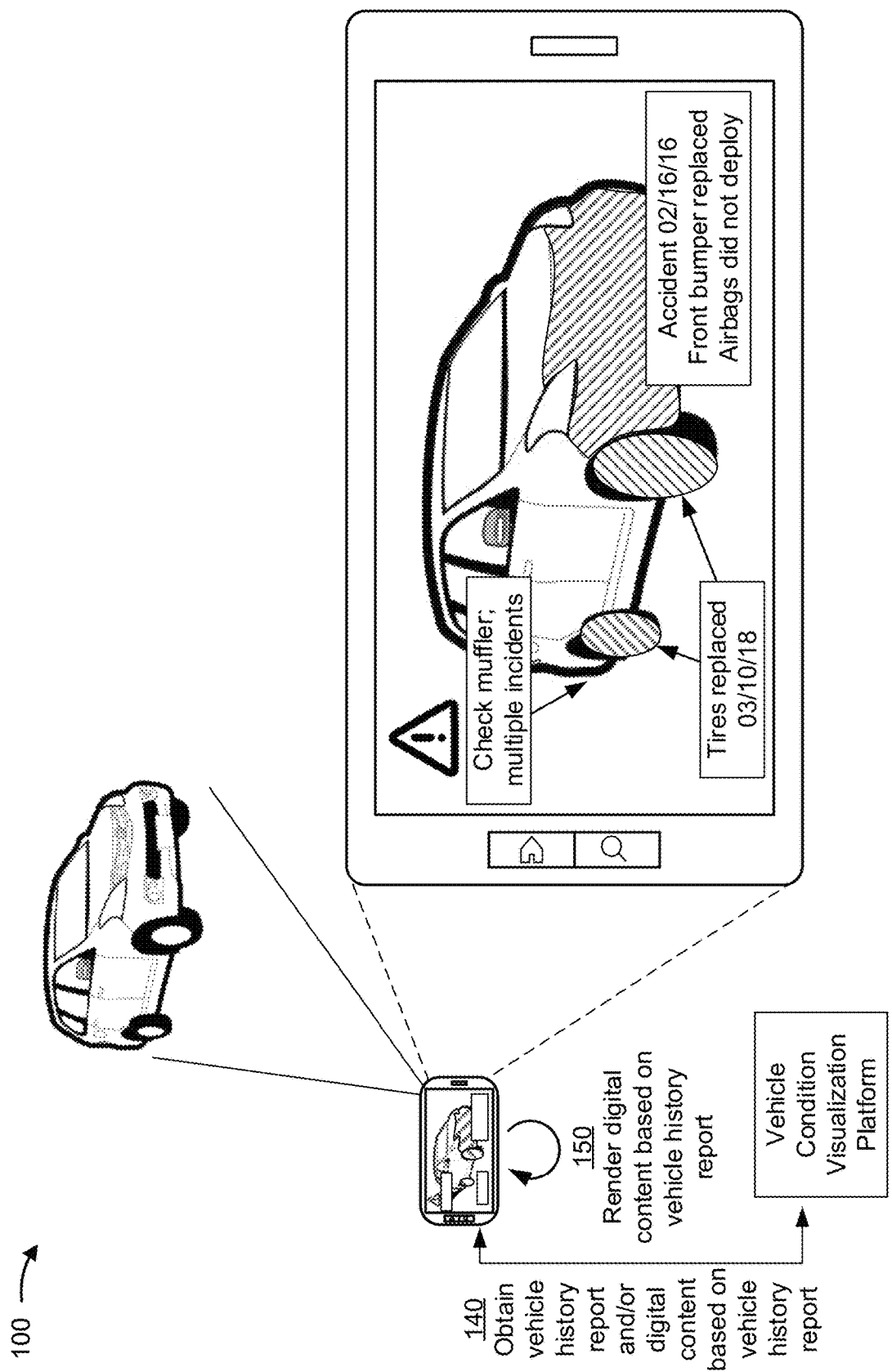

More particularly, as shown in FIG. 1B, and by reference number 140, the extended reality device may obtain a vehicle history report associated with the real-world vehicle based on one or more identifiers associated with the real-world vehicle (e.g., a vehicle identification number, a license plate number, and/or the like). In some implementations, the one or more identifiers may be input manually, read from the image data (e.g., using optical character recognition), received in a message communicated by the vehicle (e.g., where the vehicle is a connected vehicle having communication capabilities), and/or the like. As shown in FIG. 1B, the vehicle history report may be obtained from a vehicle condition visualization platform. The vehicle history report may generally include various details relating to the history of the vehicle. For example, in some implementations, the vehicle history report may include an ownership history (e.g., an estimated number of owners, year of purchase, ownership type such as personal, commercial, fleet, and/or the like, odometer readings, and/or the like), a title history (e.g., whether the vehicle was rebuilt, salvaged, acknowledged to be a lemon, damaged by hail, fire, and/or flood, and/or the like), an accident history, reported structural damage, a service history, odometer inconsistencies, open recalls, and/or the like. In some implementations, the vehicle history report may be obtained from various distributed systems, which may include a vehicle history service provider, a vehicle dealer, a vehicle maintenance company, an online service, and/or the like.

As further shown in FIG. 1B, and by reference number 150, the extended reality device may render, on a display of the extended reality device, digital content based on the vehicle history report. In some implementations, the digital content may be generated at the extended reality device, obtained from the vehicle condition visualization platform, and/or the like based on one or more records contained in the vehicle history report. For example, the extended reality device, the vehicle condition visualization platform, and/or another suitable device may scan the vehicle history report to identify one or more repair or maintenance incidents involving one or more parts of the vehicle. Accordingly, the digital content may include a patterned overlay, a colored overlay, a hologram, a digital or virtual object, and/or the like, which may be rendered on the display of the extended reality device by placing the digital content on the one or more parts involved in the repair or maintenance incident(s). Additionally, or alternatively, the digital content may include a textual description of the repair or maintenance incident(s), a visual marker to indicate the one or more parts involved in the repair or maintenance incident(s), superimposed graphics, and/or the like. For example, in FIG. 1B, the vehicle history report may include one or more records indicating that the vehicle was involved in an accident in which the airbags did not deploy, which necessitated replacing the front bumper. As further shown in FIG. 1B, the vehicle history report may include one or more records indicating a date when the tires were replaced.

Accordingly, in some implementations, the vehicle history report may be scanned, parsed, or otherwise analyzed (e.g., by the extended reality device, the vehicle condition visualization platform, and/or the like) to generate digital content that may be rendered on the display of the extended reality device to draw attention to one or more issues that a potential purchaser should check on the vehicle. Furthermore, in some implementations, this analysis may include determining a relative severity of one or more issues (e.g., based on a quantity of events that relate to the one or more issues, a quantity of events involving a given part or set of parts, whether certain events impact roadworthiness of the vehicle, whether certain events indicate potential fraud, theft, or concealment or misrepresentation of material facts, whether the vehicle was subject to fire, flood, or hail damage, whether the vehicle has been declared a total loss, whether airbags were deployed in an accident and properly replaced, whether there are one or more outstanding recalls and/or unserviced goodwill repairs, and/or the like).

For example, if the vehicle history report includes multiple incidents involving the same part or set of parts, the digital content rendered in the extended reality interface may place a greater visual emphasis on that part or set of parts (e.g., placing a visual marker, such as an alert icon, to indicate a potential problem to be given extra attention). In another example, information related to the relative severity of the one or more issues may be crowdsourced, as a general population of users, a group of users sharing certain characteristics, and/or the like may have varying opinions regarding the relative importance of various issues.

Furthermore, in addition to rendering digital content to provide a visual representation of relevant records in the history of the vehicle, the information contained in the vehicle history report may be used to aid a user in performing an inspection or evaluation of the vehicle. For example, a value and a date associated with the most recent odometer reading may be obtained from the vehicle history report, and an expected current odometer reading may be estimated based thereon (e.g., based on how much time has passed since the date associated with the most recent odometer reading, mileage patterns derived from different records, and/or the like). The extended reality device may render digital content indicating the expected current odometer reading, which can be visually compared to an actual odometer reading (e.g., by the user, using a computer vision technique, and/or the like). Accordingly, if a difference between the actual odometer reading and the expected odometer reading satisfies a threshold value, digital content to draw attention to the difference may be rendered to indicate potential odometer-related fraud (e.g., an odometer rollback).

In some implementations, the digital content rendered on the display of the extended reality device may additionally, or alternatively, be generated to draw attention to one or more items that are not included in the vehicle history report. For example, a vehicle is generally subject to a regular maintenance schedule that specifies certain service items to be performed at certain mileages, time intervals, and/or the like. Accordingly, in some implementations, the digital content rendered on the display of the extended reality device may indicate that the vehicle history report does not include one or more maintenance records that should be present based on the mileage of the vehicle (e.g., if the mileage of the vehicle indicates that spark plugs, brake pads, a timing belt, and/or the like should have been replaced and the vehicle history report does not include any such records, the digital content may be rendered to alert the user to check such part(s) to verify whether the appropriate service items were or were not performed). Additionally, or alternatively, where the vehicle history report includes records indicating that the regular maintenance scheduled was followed, the rendered digital content may provide a visual indicator that the vehicle has been well-maintained.

Figure 1C:
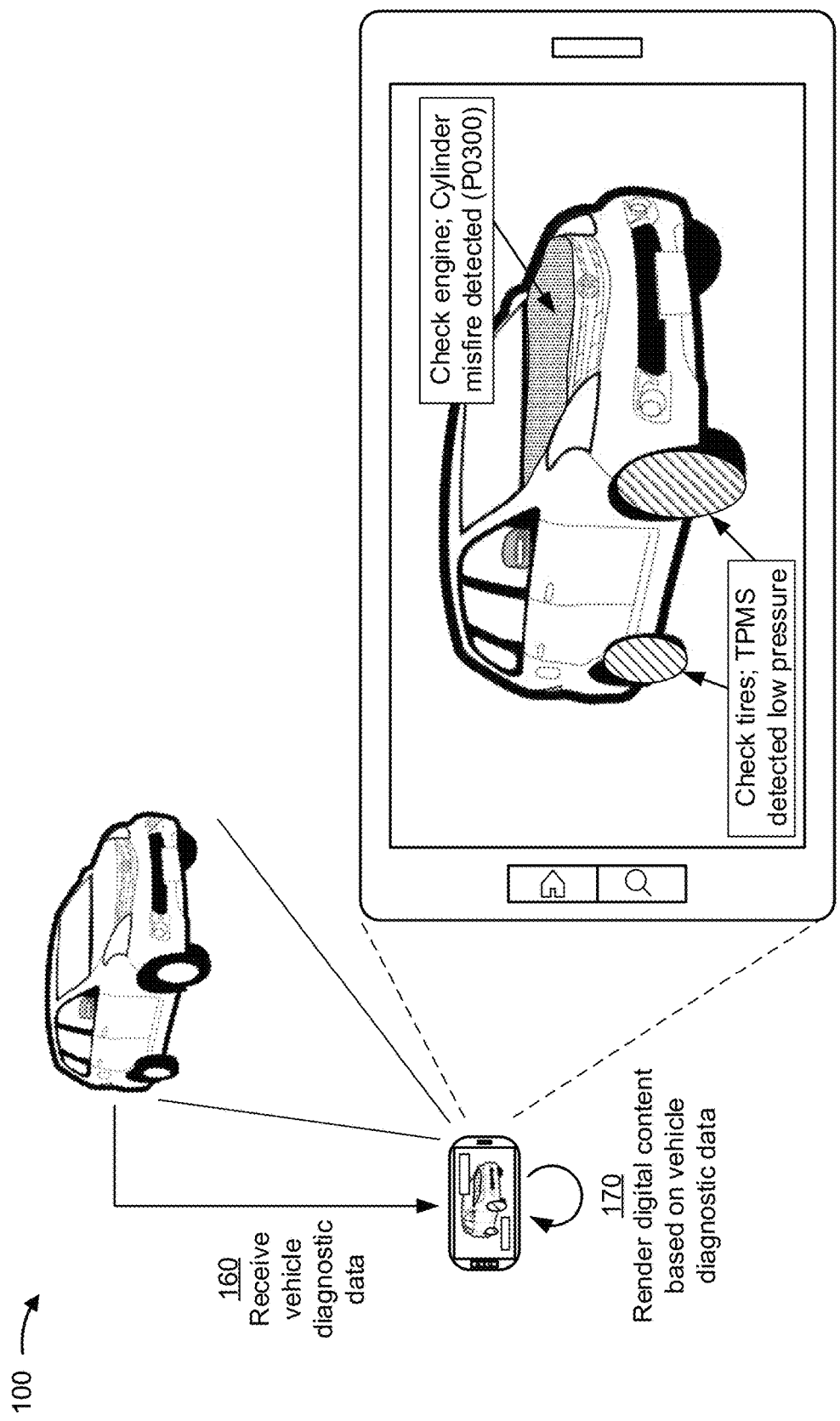

As shown in FIG. 1C, and by reference number 160, the extended reality device may receive, from the vehicle, diagnostic data related to a condition of the vehicle. The vehicle may have capabilities to convey the diagnostic data via one or more wired and/or wireless signals, and the extended reality device may include or be coupled to a device that can interface with the vehicle to receive the diagnostic data. More particularly, the vehicle may include various sensors, on-board computers, and/or the like that can self-diagnose and report a status of various subsystems. For example, in some implementations, the vehicle may include one or more on-board diagnostics (OBD) interfaces (e.g., an OBD-II interface) that may provide one or more diagnostic trouble codes to identify a malfunction in one or more vehicle subsystems. Accordingly, the vehicle may include various sensors for monitoring the vehicle subsystems (e.g., an oxygen sensor for measuring unburned oxygen present in an exhaust pipe, a tire pressure monitoring system (TPMS) for detecting tire pressure, a spark knock sensor for ensuring that fuel is burned correctly, an engine speed sensor for monitoring a crankshaft spinning speed, and/or the like) and the vehicle diagnostic data may indicate a status (including potential malfunctions, warnings, and/or the like) reported by one or more of the various sensors. Furthermore, in some implementations, the diagnostic data may include other information related to the condition of the vehicle, such as a service history.

As further shown in FIG. 1C, and by reference number 170, the extended reality device may render, on the display of the extended reality device, digital content based on the diagnostic data received from the vehicle. For example, as shown in FIG. 1C, the rendered digital content includes a first patterned overlay superimposed on a hood of the vehicle as well as a textual description of the relevant diagnostic data (e.g., recommending that the user check the engine because the vehicle diagnostic data indicates that the vehicle reported a cylinder misfire associated with a particular diagnostic trouble code). As further shown in FIG. 1C, the rendered digital content includes a second patterned overlay superimposed on the tires of the vehicle and a textual description of the relevant diagnostic data (e.g., recommending that the user check the tires because the TPMS associated with the vehicle reported a low tire pressure, which can lead to premature wear, tread separation, blowout, and/or the like). Accordingly, in this way, the digital content may provide a clear and simple to understand visual indicator of the vehicle diagnostic data. Furthermore, because there are often hundreds or thousands of possible diagnostic trouble codes, rendering the digital content based on the vehicle diagnostic data may conserve computing and network resources that would otherwise by wasted by the user attempting to locate information that provides detail relating to the diagnostic trouble codes. Further still, the digital content rendered on the extended reality device may be easy to interpret while quickly drawing the attention of the user to the relevant part(s) of the vehicle.

Figure 1D:
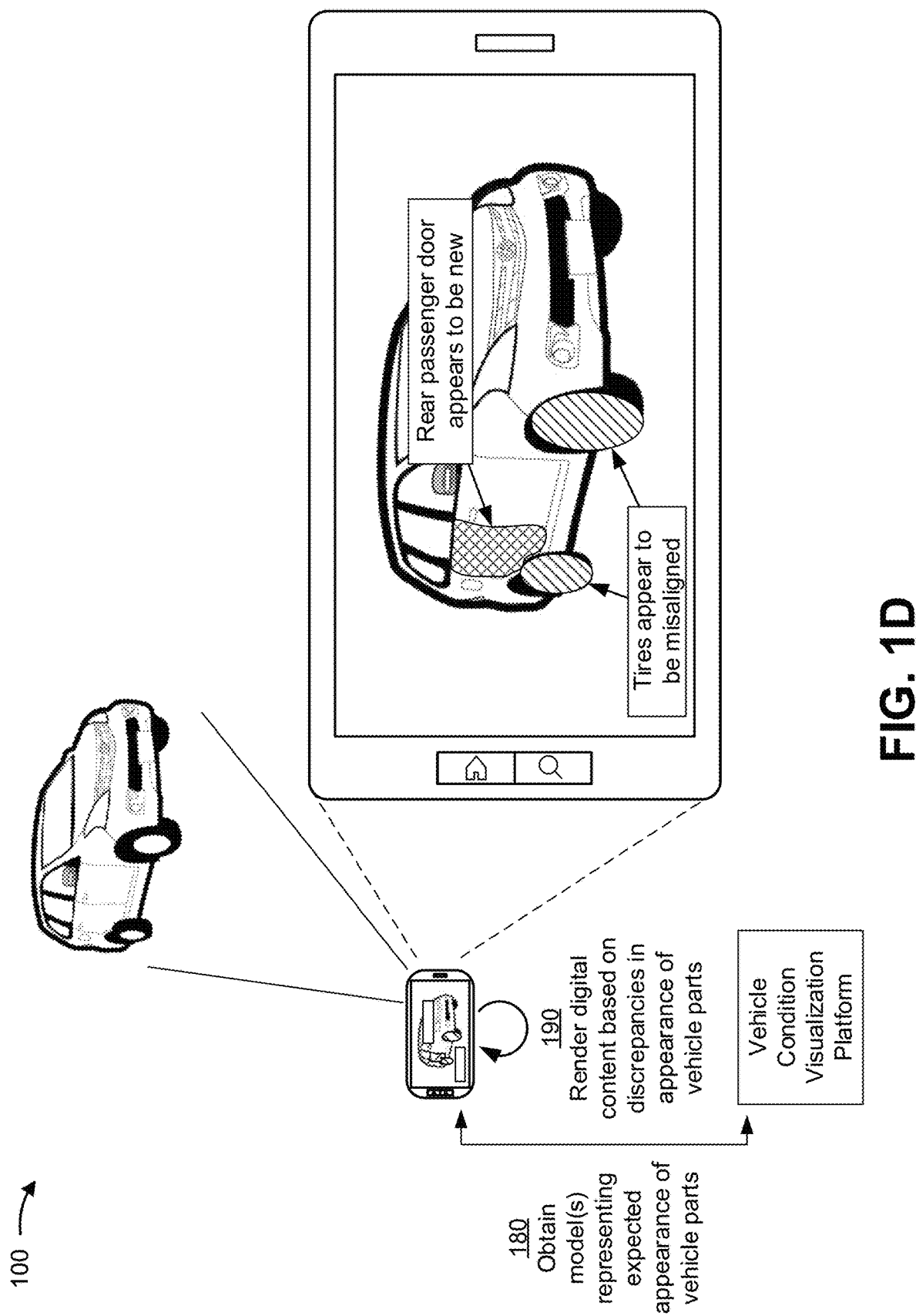

As shown in FIG. 1D, and by reference number 180, the extended reality device may obtain one or more models that represent an expected appearance of one or more parts of the vehicle from the vehicle condition visualization platform. For example, the vehicle condition visualization platform may train the one or more models using information that includes various parameters related to a visual appearance of parts associated with a specific vehicle (e.g., based on make, model, and year), a visual appearance of parts associated with certain vehicle types (e.g., sedans, convertibles, pickup trucks, sport utility vehicles, and/or the like), a visual appearance that certain parts typically have after a given level of wear-and-tear, a visual appearance of a vehicle as a whole, and/or the like, to output a representation of the expected appearance of the one or more parts of the vehicle. Additionally, or alternatively, the one or more models may be trained using information that relates to labels and/or markings on one or more parts of the vehicle (e.g., serial numbers, part numbers, vendor identifiers, and/or the like), which may provide indications as to whether and/or when a given part was discontinued, when a given part was first introduced, whether a given part is an aftermarket part or an original part, a vendor that provides a given part, and/or the like. In some implementations, the one or more models may be arranged according to a hierarchy (e.g., a generic model could be used to classify vehicle image data into a particular make, make and model, and/or the like, and additional models may be used to represent various subsystems, individual parts, and/or the like based on the particular make, make and model, and/or the like).

In some implementations, the vehicle condition visualization platform may perform a training operation when generating the one or more models that represent an expected appearance of one or more parts of the vehicle. For example, the vehicle condition visualization platform may portion vehicle image data into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the vehicle condition visualization platform may preprocess and/or perform dimensionality reduction to reduce the vehicle image data to a minimum feature set. In some implementations, the vehicle condition visualization platform may train the one or more models on this minimum feature set, thereby reducing processing to train the machine learning model, and may apply a classification technique, to the minimum feature set.

In some implementations, the vehicle condition visualization platform may use a classification technique, such as a logistic regression classification technique, a random forest classification technique, a gradient boosting machine learning (GBM) technique, and/or the like, to determine a categorical outcome (e.g., that a given vehicle part depicted in the vehicle image data is new, worn down, in need of repair or maintenance, has been recalled, and/or the like). Additionally, or alternatively, the vehicle condition visualization platform may use a naïve Bayesian classifier technique. In this case, the vehicle condition visualization platform may perform binary recursive partitioning to split the data of the minimum feature set into partitions and/or branches and use the partitions and/or branches to perform predictions (e.g., a condition of one or more vehicle parts). Based on using recursive partitioning, the vehicle condition visualization platform may reduce utilization of computing resources relative to manual, linear sorting and analysis of data points, thereby enabling use of thousands, millions, or billions of data points to train a model, which may result in a more accurate model than using fewer data points.

Additionally, or alternatively, the vehicle condition visualization platform may use a support vector machine (SVM) classifier technique to generate a non-linear boundary between data points in the training set. In this case, the non-linear boundary is used to classify test data (e.g., vehicle image data) into a particular class (e.g., a class indicating that the vehicle image data depicts a part in good working condition, a class indicating that the part depicted in the vehicle image data is in poor condition or in need of maintenance or repair, and/or the like).

Additionally, or alternatively, the vehicle condition visualization platform may use a computer vision technique, such as a convolutional neural network technique to assist in classifying the test data into a particular class. In some cases, the computer vision technique may include using an image recognition technique (e.g., an Inception framework, a ResNet framework, a Visual Geometry Group (VGG) framework, and/or the like), a machine learning object detection technique (e.g., a Viola-Jones object detection framework based on Haar features, a scale-invariant feature transform (SIFT), a histogram of oriented gradients (HOG), and/or the like), a deep learning object detection technique (e.g. a Single Shot Detector (SSD) framework, a You Only Look Once (YOLO) framework, and/or the like), an object in motion technique (e.g., an optical flow framework and/or the like), and/or the like.

Additionally, or alternatively, the vehicle condition visualization platform may train the one or more models using a supervised training procedure that includes receiving input to the model from a subject matter expert, which may reduce an amount of time, an amount of processing resources, and/or the like to train the one or more models relative to an unsupervised training procedure. In some implementations, the vehicle condition visualization platform may use one or more other model training techniques, such as a neural network technique, a latent semantic indexing technique, and/or the like. For example, the vehicle condition visualization platform may perform an artificial neural network processing technique (e.g., using a two-layer feedforward neural network architecture, a three-layer feedforward neural network architecture, and/or the like) to perform pattern recognition with regard to the condition of vehicle parts depicted in certain images, video frames, and/or the like. In this case, using the artificial neural network processing technique may improve an accuracy of the one or more models by being more robust to noisy, imprecise, or incomplete data, and by enabling the vehicle condition visualization platform to detect patterns and/or trends related to the condition of the parts of the vehicle that may be undetectable to human analysts or systems using less complex techniques.

In some implementations, a different device, such as a server device, may generate and train the one or more models. The different device may send the one or more models to the vehicle condition visualization platform. The different device may update and send (e.g., on a scheduled basis, on an on-demand basis, on a triggered basis, on a periodic basis, and/or the like) the one or more models to the vehicle condition visualization platform.

Accordingly, the vehicle condition visualization platform may use any number of artificial intelligence techniques, machine learning techniques, deep learning techniques, and/or the like to generate the one or more models that represent the expected appearance of one or more parts of the vehicle. Furthermore, in some implementations, the extended reality device may provide image data related to the real-world vehicle to the vehicle condition visualization platform for determining the condition of one or more parts depicted therein based on the one or more models and/or locally process the vehicle image data using the one or more models in combination with one or more artificial intelligence techniques.

As further shown in FIG. 1D, and by reference number 190, the extended reality device may render digital content on the display of the extended reality device based on one or more discrepancies in the appearance of one or more parts depicted in the image data, which may be detected using the one or more artificial intelligence techniques and the one or more models representing the expected appearance of the one or more parts depicted in the image data.

The extended reality device may obtain image data corresponding to an exterior of the vehicle, an interior of the vehicle, an undercarriage of the vehicle, an engine bay of the vehicle, and/or the like, and the one or more models may be used in combination with the one or more artificial intelligence techniques to detect one or more discrepancies that relate to a condition of the vehicle based on the image data. For example, in some implementations, the one or more models may be used in combination with the one or more artificial intelligence techniques to detect that one or more parts depicted in the image data appear to be newer than other parts of the vehicle, which may indicate that the part appears to have been repaired or replaced, that the other parts appear worn down and may need repair or maintenance, and/or the like. In another example, the one or more models may be used in combination with the one or more artificial intelligence techniques to detect aftermarket modifications to the vehicle (e.g., that the vehicle has a turbocharger, aftermarket stereo equipment, custom trim, and/or the like).

In this way, the one or more models and the one or more artificial intelligence techniques can be used to inspect a condition of the vehicle and potentially detect one or more issues related to the condition of the vehicle that are not listed in a vehicle history report, not indicated in diagnostic data provided by the vehicle, and/or the like. For example, where various parts in the engine bay are covered in dust and debris that typically accumulate over time from normal driving but an intake manifold has substantially less dust and debris than the other parts, this may indicate that the intake manifold was swapped out. In another example, the visual inspection performed using the one or more artificial intelligence techniques can be used to detect issues related to improper service (e.g., an incompatible battery could be detected based on the image data indicating that the battery is the wrong size or otherwise differs from the expected visual appearance). In a further example, even if the vehicle history report does not list any records indicating that the tires were replaced, the one or more artificial intelligence techniques may detect that the tires were replaced based on the tires appearing shinier, having less tread wear, and/or the like compared to what would be expected given the mileage on the vehicle. Relatedly, where one or more tires appear shinier, have better tread, and/or the like relative to other tires, this may indicate that a blowout occurred such that the user should check for possible alignment issues. In this way, the visual inspection based on the one or more artificial intelligence techniques can detect issues that may be in need of repair or maintenance in addition to identifying parts of the vehicle that have been repaired or replaced. In this way, substantial computing and/or network resources may be conserved (e.g., resources that would otherwise be wasted by the user researching or otherwise investigating whether there is an issue).

In some implementations, the one or more artificial intelligence techniques may also be used to detect issues such as VIN fraud, flood damage, cosmetic damage (e.g., dents, scratches, and/or the like), and/or other issues that may relate to the condition of the vehicle.

For example, the image data may be examined to identify signs of tampering and/or discrepancies among the VIN plates on the dash, driver's side door, car frame, and/or the like. If there are any signs of tampering and/or discrepancies, the digital content rendered on the display of the extended reality device may alert the user to indicate that the vehicle may have a stolen or cloned VIN.

With respect to flood damage, the image data may be examined to detect loose, new, stained, and/or mismatching upholstery or carpeting, rust (e.g., around doors, under the dashboard, on the pedals, inside the hood and/or trunk latches), mud or silt in the glove compartment or under the seats, brittle wires under the dashboard, and/or fog or moisture beads in the interior lights, exterior lights, and/or instrument panel. In this way, a potential purchaser may be alerted as to the possibility of flood damage, which can eat away at electronics wiring, cause mechanical systems to seize, cause corrosion and rust that destroys sheet metal and components from the inside out, and/or the like.

In some implementations, similar techniques can be applied to detect evidence that one or more airbags previously deployed, which may indicate a potential safety hazard if the airbags are not properly replaced. For example, the image data may be examined for scratches, burn marks, discoloration, and/or the like on the steering wheel, dashboard, and/or other surrounding surfaces. In another example, even if everything appears to be new, the image data may be examined to determine whether the airbag covers appear to be from the same manufacturer as the vehicle, as inexpensive generic airbags will often lack the manufacturer logo, have a different color or build quality, and/or the like.

Accordingly, in this way, analyzing the vehicle image data using the one or more models and the one or more artificial intelligence techniques can be used to perform a visual inspection of the vehicle that may reveal various potential issues relating to the condition of the vehicle. In this way, by using computer vision based on visible features of the vehicle, issues that may not be listed in a vehicle history report, indicated in vehicle diagnostics data, and/or the like may be revealed, discrepancies between the vehicle history report, the diagnostics data, and the actual condition of the vehicle may be detected, and/or the like. In this way, substantial computing and/or network resources may be conserved because the potential purchaser may avoid performing research to understand items in the vehicle history report and/or the diagnostics data, and extended reality capabilities may provide the potential purchaser with the ability to visually evaluate various sources of information about the condition of the vehicle. This may also provide the potential purchaser with information to enable a well-informed decision regarding whether to purchase the vehicle, how much to offer for the vehicle, and/or the like. Furthermore, in addition to enabling a consumer to make an informed decision regarding a potential purchase by enabling the consumer to understand the vehicle history and identify possible omissions in the vehicle history, these techniques may also be useful for financial service providers, vehicle dealers, and/or the like. For example, a financial service provider may ingest this information to adjust one or more loan terms (e.g., a loan amount that may affect pricing) to minimize risk. Similarly, vehicle dealers could also use this information to identify discrepancies with respect to a trade-in and adjust the offered value for the trade-in.

As indicated above, FIGS. 1A-1D are provided merely as one or more examples. Other examples may differ from what is described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple and/or distributed devices. Additionally, or alternatively, a set of devices (e.g., one or more devices) of example implementation(s) 100 may perform one or more functions described as being performed by another set of devices of example implementation(s) 100. For example, every operation described herein as being performed by the vehicle condition visualization platform may be performed by the extended reality device, and vice versa.

Figure 2:
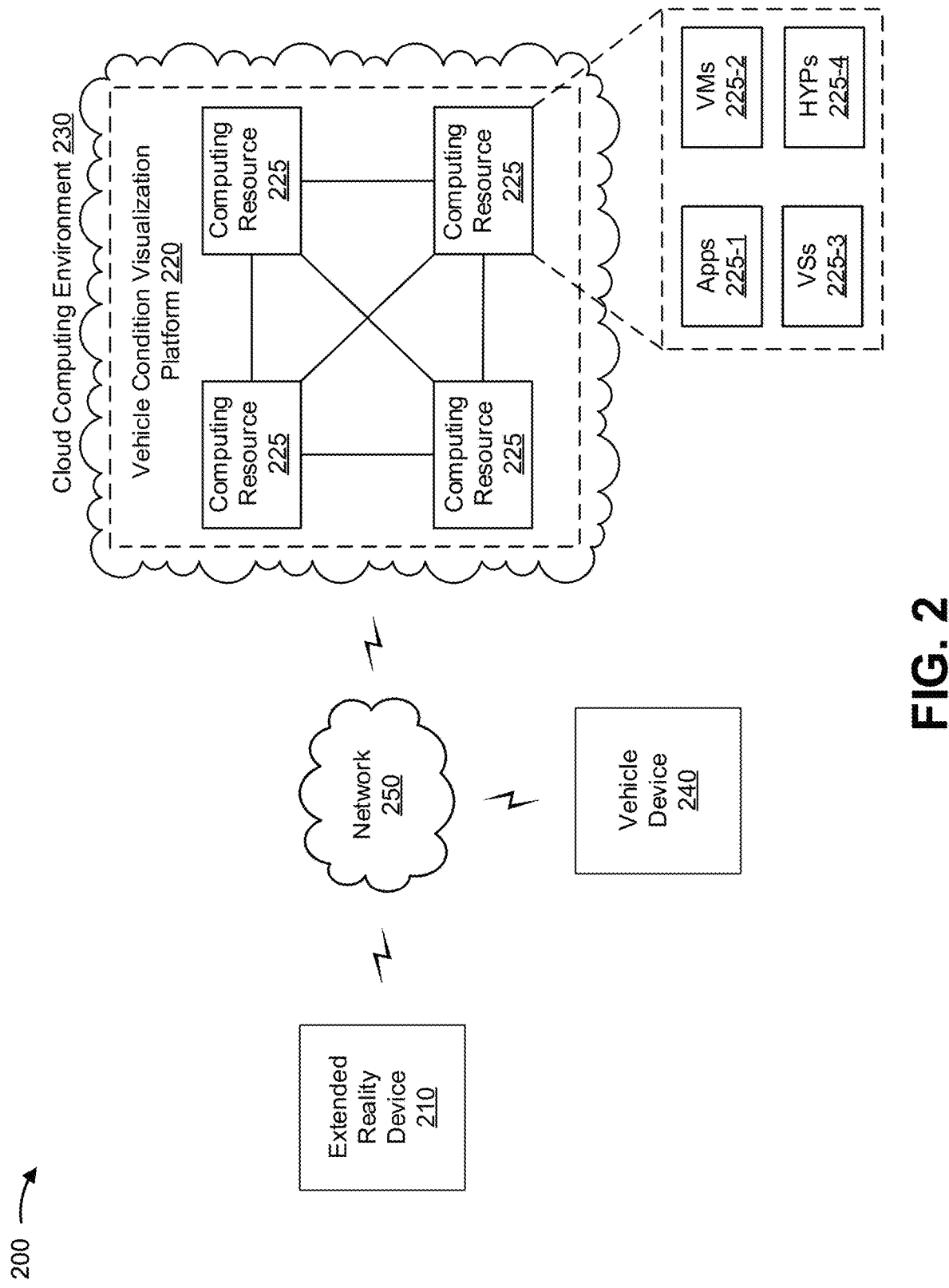
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an extended reality (XR) device 210, a vehicle condition visualization platform 220, a computing resource 225, a cloud computing environment 230, a vehicle device 240, and a network 250. Devices of environment 200 may interconnect via wired connections, wireless connections, or a combination of wired and wireless connections.

Extended reality device 210 includes one or more devices capable of receiving, generating, storing, processing, displaying, and/or providing information associated with a condition of one or more vehicles, as described herein. For example, extended reality device 210 may be a device having augmented reality and/or mixed reality capabilities, such as an optical see-through display device, a video see-through display device, a holographic display device, a heads-up display device, a smartphone, a tablet computer, a handheld computer, and/or the like. Additionally, or alternatively, extended reality device 210 may be a virtual reality device, such as a virtual reality headset, a head-mounted display device, and/or the like. Extended reality device 210 includes one or more display devices capable of rendering digital content in combination with one or more images of a vehicle to represent information related to a condition of the vehicle. For example, in some implementations, the one or more display devices may include technologies such as liquid crystal display (LCDs) devices, light-emitting diode (LED) display devices, plasma display devices, wearable display devices (e.g., head-mounted display devices), handheld display devices, stereoscopic or three-dimensional display devices, and/or the like.

Vehicle condition visualization platform 220 includes one or more computing resources assigned to receiving, generating, storing, processing, and/or providing information related to a condition of one or more vehicles. For example, vehicle condition visualization platform 220 may be a platform implemented by cloud computing environment 230 that may receive, generate, store, process, and/or provide information related to one or more vehicle history reports, diagnostic data associated with one or more vehicles, data models for representing an expected visual appearance of one or more vehicle parts, digital content for visualizing information related to a condition of one or more vehicles, and/or the like. In some implementations, vehicle condition visualization platform 220 is implemented by computing resources 225 of cloud computing environment 230.

Vehicle condition visualization platform 220 may include a server device or a group of server devices. In some implementations, vehicle condition visualization platform 220 may be hosted in cloud computing environment 230. Notably, while implementations described herein describe vehicle condition visualization platform 220 as being hosted in cloud computing environment 230, in some implementations, vehicle condition visualization platform 220 may be non-cloud-based or may be partially cloud-based.

Cloud computing environment 230 includes an environment that delivers computing as a service, whereby shared resources, services, etc. may be provided to extended reality device 210 and/or vehicle device 240. Cloud computing environment 230 may provide computation, software, data access, storage, and/or other services that do not require end-user knowledge of a physical location and configuration of a system and/or a device that delivers the services. As shown, cloud computing environment 230 may include vehicle condition visualization platform 220 and computing resource 225.

Computing resource 225 includes one or more personal computers, workstation computers, server devices, or another type of computation and/or communication device. In some implementations, computing resource 225 may host vehicle condition visualization platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by extended reality device 210 and/or vehicle device 240. Application 225-1 may eliminate a need to install and execute the software applications on extended reality device 210 and/or vehicle device 240. For example, application 225-1 may include software associated with vehicle condition visualization platform 220 and/or any other software capable of being provided via cloud computing environment 230. In some implementations, one application 225-1 may send and/or receive information to and/or from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program and may support a single process. In some implementations, virtual machine 225-2 may execute on behalf of a user (e.g., extended reality device 210 and/or vehicle device 240), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems and may manage the execution of the guest operating systems. Multiple instances of a variety of operating systems may share virtualized hardware resources.

Vehicle device 240 includes one or more devices capable of receiving, generating, storing, processing, and/or providing information, such as information described herein. In some implementations, vehicle device 240 may include a device integrated within a vehicle (e.g., a car, a truck, a motorcycle, a bus, a boat, farm equipment, construction equipment, and/or the like). For example, vehicle device 240 may include an in-vehicle infotainment (IVI) system, an in-car entertainment (ICE) system, a telematics device, a Global Positioning System (GPS) device, an electronic control module (ECM), an on-board diagnostics (OBD) device, and/or a similar type of device. In some implementations, vehicle device 240 may include a device that is separate from but associated with a vehicle, such as a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, vehicle device 240 may receive information from and/or transmit information to extended reality device 210 and/or vehicle condition visualization platform 220, as described herein.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
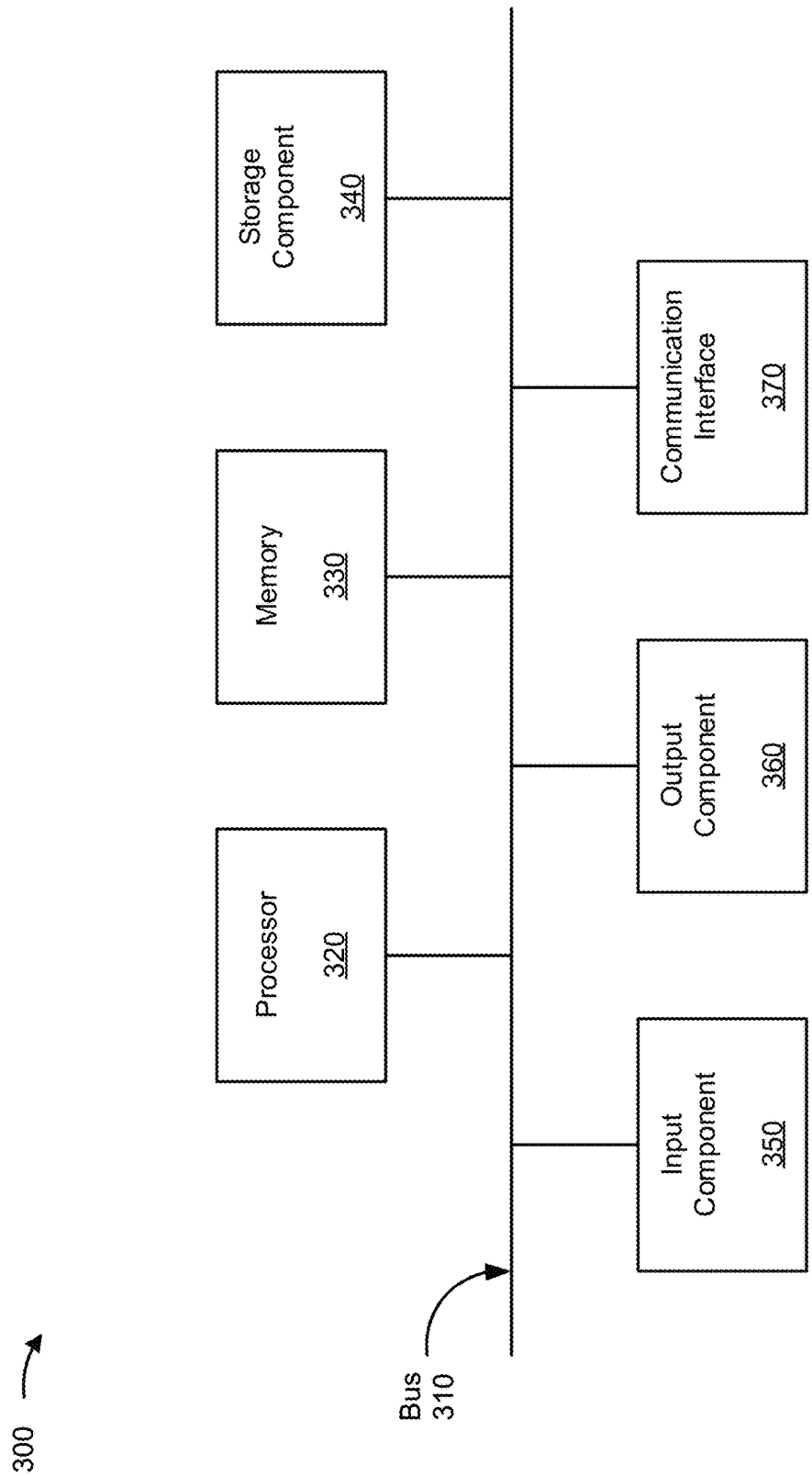
FIG. 3 is a diagram of example components of one or more devices of FIG. 2.

FIG. 3 is a diagram of example components of a device 300. Device 300 may correspond to extended reality device 210, vehicle condition visualization platform 220, and/or vehicle device 240. In some implementations, extended reality device 210, vehicle condition visualization platform 220, and/or vehicle device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as one or more examples. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
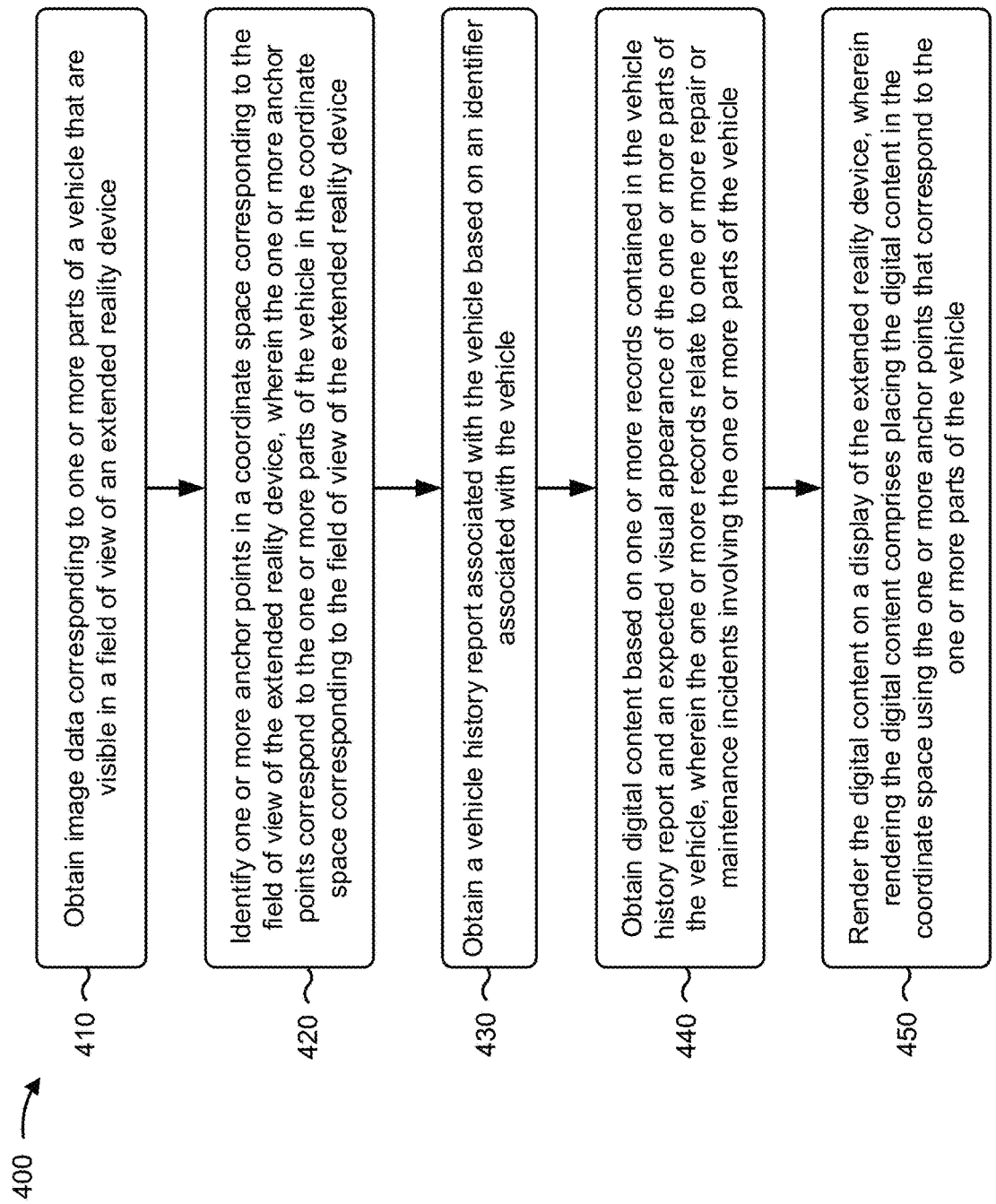
FIGS. 4-6 are flow charts of example processes for visualizing a vehicle condition using extended reality.

FIG. 4 is a flow chart of an example process 400 for visualizing a vehicle condition using extended reality. In some implementations, one or more process blocks of FIG. 4 may be performed by an extended reality device (e.g., extended reality device 210). In some implementations, one or more process blocks of FIG. 4 may be performed by another device or a group of devices separate from or including the extended reality device, such as a vehicle condition visualization platform (e.g., vehicle condition visualization platform 220), a vehicle device (e.g., vehicle device 240), and/or the like.

As shown in FIG. 4, process 400 may include obtaining image data corresponding to one or more parts of a vehicle that are visible in a field of view of an extended reality device (block 410). For example, the extended reality device (e.g., using processor 320, memory 330, storage component 340, input component 350, output component 360, communication interface 370, and/or the like) may obtain image data corresponding to one or more parts of a vehicle that are visible in a field of view of the extended reality device, as described above.

As further shown in FIG. 4, process 400 may include identifying one or more anchor points in a coordinate space corresponding to the field of view of the extended reality device, wherein the one or more anchor points correspond to the one or more parts of the vehicle in the coordinate space corresponding to the field of view of the extended reality device (block 420). For example, the extended reality device (e.g., using processor 320, memory 330, storage component 340, input component 350, output component 360, communication interface 370, and/or the like) may identify one or more anchor points in a coordinate space corresponding to the field of view of the extended reality device, as described above. In some implementations, the one or more anchor points correspond to the one or more parts of the vehicle in the coordinate space corresponding to the field of view of the extended reality device.

As further shown in FIG. 4, process 400 may include obtaining a vehicle history report associated with the vehicle based on an identifier associated with the vehicle (block 430). For example, the extended reality device (e.g., using processor 320, memory 330, storage component 340, input component 350, output component 360, communication interface 370, and/or the like) may obtain a vehicle history report associated with the vehicle based on an identifier associated with the vehicle, as described above.

As further shown in FIG. 4, process 400 may include obtaining digital content based on one or more records contained in the vehicle history report and an expected visual appearance of the one or more parts of the vehicle, wherein the one or more records relate to one or more repair or maintenance incidents involving the one or more parts of the vehicle (block 440). For example, the extended reality device (e.g., using processor 320, memory 330, storage component 340, input component 350, output component 360, communication interface 370, and/or the like) may obtain digital content based on one or more records contained in the vehicle history report and an expected visual appearance of the one or more parts of the vehicle, as described above. In some implementations, the one or more records may relate to one or more repair or maintenance incidents involving the one or more parts of the vehicle.

As further shown in FIG. 4, process 400 may include rendering the digital content on a display of the extended reality device, wherein rendering the digital content comprises placing the digital content in the coordinate space using the one or more anchor points that correspond to the one or more parts of the vehicle (block 450). For example, the extended reality device (e.g., using processor 320, memory 330, storage component 340, input component 350, output component 360, communication interface 370, and/or the like) may render the digital content on a display of the extended reality device, as described above. In some implementations, rendering the digital content may comprise placing the digital content in the coordinate space using the one or more anchor points that correspond to the one or more parts of the vehicle.

Process 400 may include additional implementations, such as any single implementation or any combination of implementations described below and/or in connection with one or more other processes described elsewhere herein.

In some implementations, the digital content may include one or more of a colored overlay or a patterned overlay placed on the one or more anchor points. In some implementations, the digital content may include a textual description of the one or more repair or maintenance incidents and identifies the one or more parts of the vehicle involved in the one or more repair or maintenance incidents. In some implementations, the extended reality device may visually emphasize a specific part of the vehicle on the display to indicate that the vehicle history report includes information related to multiple incidents involving the specific part of the vehicle.

In some implementations, the extended reality device may obtain, from one or more machine learning models, an output that provides a representation of the expected visual appearance of the one or more parts of the vehicle and identify, based on the image data and the representation provided by the output from the one or more machine learning models, at least one discrepancy between an actual visual appearance and the expected visual appearance of the one or more parts of the vehicle. In some implementations, the extended reality device may obtain additional digital content based on the at least one discrepancy between the actual visual appearance and the expected visual appearance of the one or more parts of the vehicle and render the additional digital content to visually emphasize the at least one discrepancy.

In some implementations, the additional digital content may indicate that the one or more parts of the vehicle appear to have been repaired or replaced. In some implementations, the additional digital content may indicate that the one or more parts of the vehicle appear to need repair or maintenance.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
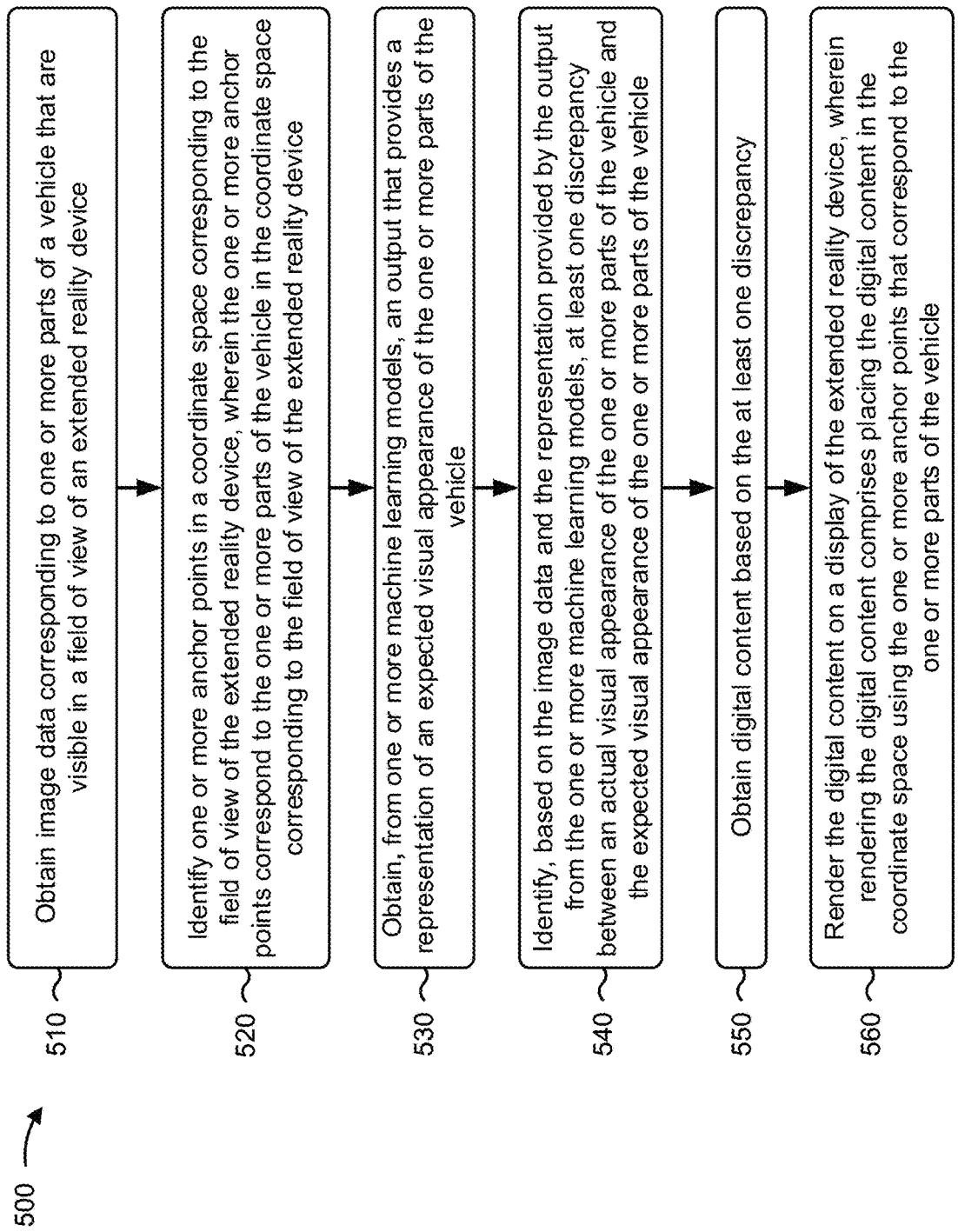

FIG. 5 is a flow chart of an example process 500 for visualizing a vehicle condition using extended reality. In some implementations, one or more process blocks of FIG. 5 may be performed by an extended reality device (e.g., extended reality device 210). In some implementations, one or more process blocks of FIG. 5 may be performed by another device or a group of devices separate from or including the extended reality device, such as a vehicle condition visualization platform (e.g., vehicle condition visualization platform 220), a vehicle device (e.g., vehicle device 240), and/or the like.

As shown in FIG. 5, process 500 may include obtaining image data corresponding to one or more parts of a vehicle that are visible in a field of view of an extended reality device (block 510). For example, the extended reality device (e.g., using processor 320, memory 330, storage component 340, input component 350, output component 360, communication interface 370, and/or the like) may obtain image data corresponding to one or more parts of a vehicle that are visible in a field of view of the extended reality device, as described above.

As further shown in FIG. 5, process 500 may include identifying one or more anchor points in a coordinate space corresponding to the field of view of the extended reality device, wherein the one or more anchor points correspond to the one or more parts of the vehicle in the coordinate space corresponding to the field of view of the extended reality device (block 520). For example, the extended reality device (e.g., using processor 320, memory 330, storage component 340, input component 350, output component 360, communication interface 370, and/or the like) may identify one or more anchor points in a coordinate space corresponding to the field of view of the extended reality device, as described above. In some implementations, the one or more anchor points correspond to the one or more parts of the vehicle in the coordinate space corresponding to the field of view of the extended reality device.

As further shown in FIG. 5, process 500 may include obtaining, from one or more machine learning models, an output that provides a representation of an expected visual appearance of the one or more parts of the vehicle (block 530). For example, the extended reality device (e.g., using processor 320, memory 330, storage component 340, input component 350, output component 360, communication interface 370, and/or the like) may obtain, from one or more machine learning models, an output that provides a representation of an expected visual appearance of the one or more parts of the vehicle, as described above.

As further shown in FIG. 5, process 500 may include identifying, based on the image data and the representation provided by the output from the one or more machine learning models, at least one discrepancy between an actual visual appearance of the one or more parts of the vehicle and the expected visual appearance of the one or more parts of the vehicle (block 540). For example, the extended reality device (e.g., using processor 320, memory 330, storage component 340, input component 350, output component 360, communication interface 370, and/or the like) may identify, based on the image data and the representation provided by the output from the one or more machine learning models, at least one discrepancy between an actual visual appearance of the one or more parts of the vehicle and the expected visual appearance of the one or more parts of the vehicle, as described above.

As further shown in FIG. 5, process 500 may include obtaining digital content based on the at least one discrepancy (block 550). For example, the extended reality device (e.g., using processor 320, memory 330, storage component 340, input component 350, output component 360, communication interface 370, and/or the like) may obtain digital content based on the at least one discrepancy, as described above.

As further shown in FIG. 5, process 500 may include rendering the digital content on a display of the extended reality device, wherein rendering the digital content comprises placing the digital content in the coordinate space using the one or more anchor points that correspond to the one or more parts of the vehicle (block 560). For example, the extended reality device (e.g., using processor 320, memory 330, storage component 340, input component 350, output component 360, communication interface 370, and/or the like) may render the digital content on a display of the extended reality device, as described above. In some implementations, rendering the digital content may comprise placing the digital content in the coordinate space using the one or more anchor points that correspond to the one or more parts of the vehicle.

Process 500 may include additional implementations, such as any single implementation or any combination of implementations described below and/or in connection with one or more other processes described elsewhere herein.

In some implementations, the digital content may indicate that the one or more parts of the vehicle appear to have been repaired or replaced. In some implementations, the digital content may indicate that the one or more parts of the vehicle appear to need repair or maintenance.

In some implementations, the one or more machine learning models may be trained based on image data corresponding to a make, model, and year associated with the vehicle.

In some implementations, the digital content may include one or more of a colored overlay or a patterned overlay placed on the one or more anchor points. In some implementations, the digital content may include a textual description of the at least one discrepancy. In some implementations, the digital content rendered on the display of the extended reality device may be further based on diagnostics data received from the vehicle.

In some implementations, the extended reality device may obtain a vehicle history report associated with the vehicle based on an identifier associated with the vehicle, obtain additional digital content based on one or more records in the vehicle history report that relate to one or more repair or maintenance incidents involving the one or more parts of the vehicle, and visually emphasize the one or more repair or maintenance incidents involving the one or more parts of the vehicle when rendering the digital content.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
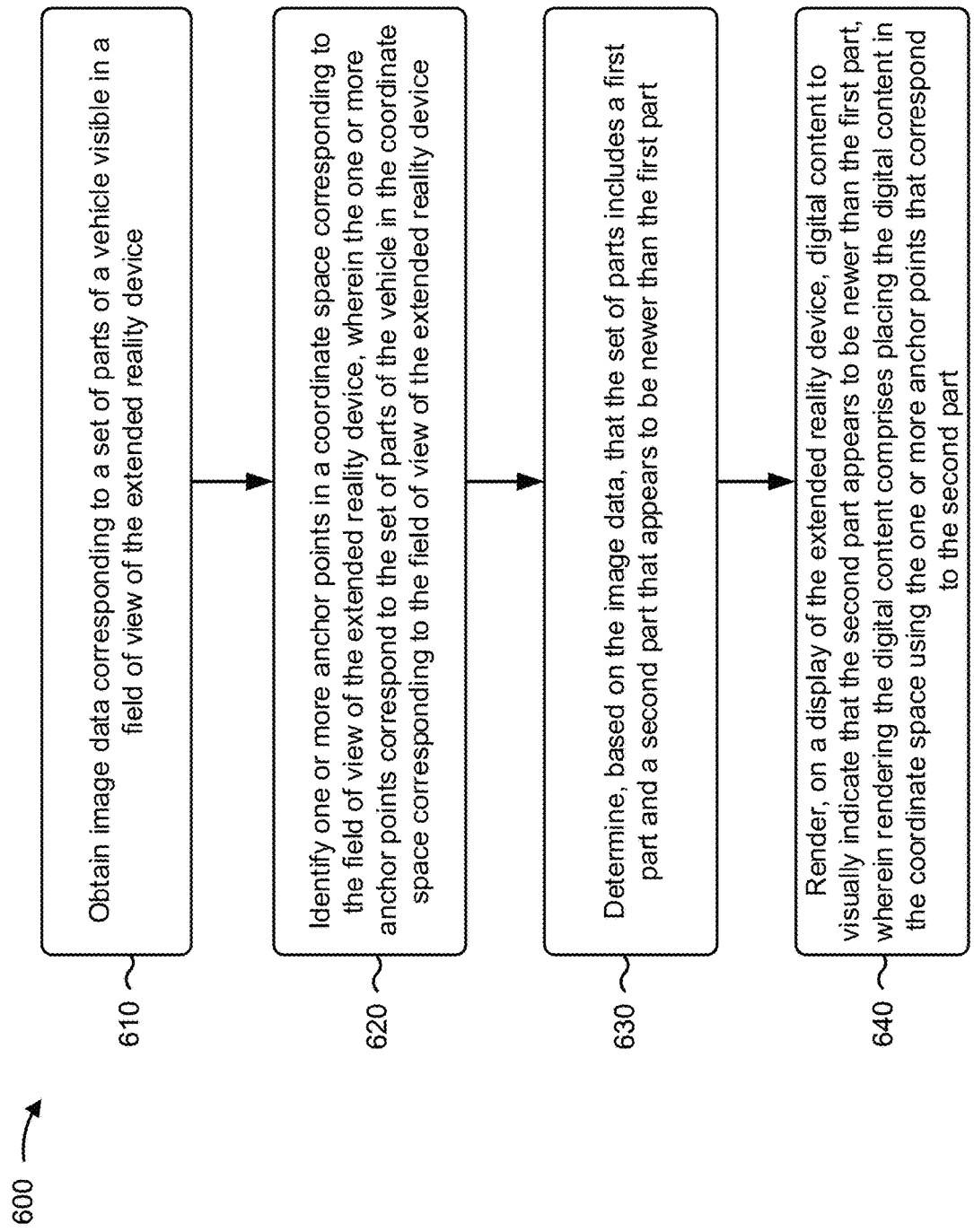

FIG. 6 is a flow chart of an example process 600 for visualizing a vehicle condition using extended reality. In some implementations, one or more process blocks of FIG. 6 may be performed by an extended reality device (e.g., extended reality device 210). In some implementations, one or more process blocks of FIG. 6 may be performed by another device or a group of devices separate from or including the extended reality device, such as a vehicle condition visualization platform (e.g., vehicle condition visualization platform 220), a vehicle device (e.g., vehicle device 240), and/or the like.

As shown in FIG. 6, process 600 may include obtaining image data corresponding to a set of parts of a vehicle visible in a field of view of an extended reality device (block 610). For example, the extended reality device (e.g., using processor 320, memory 330, storage component 340, input component 350, output component 360, communication interface 370, and/or the like) may obtain image data corresponding to a set of parts of a vehicle visible in a field of view of the extended reality device, as described above.

As further shown in FIG. 6, process 600 may include identifying one or more anchor points in a coordinate space corresponding to the field of view of the extended reality device, wherein the one or more anchor points correspond to the set of parts of the vehicle in the coordinate space corresponding to the field of view of the extended reality device (block 620). For example, the extended reality device (e.g., using processor 320, memory 330, storage component 340, input component 350, output component 360, communication interface 370, and/or the like) may identify one or more anchor points in a coordinate space corresponding to the field of view of the extended reality device, as described above. In some implementations, the one or more anchor points correspond to the set of parts of the vehicle in the coordinate space corresponding to the field of view of the extended reality device.

As further shown in FIG. 6, process 600 may include determining, based on the image data, that the set of parts includes a first part and a second part that appears to be newer than the first part (block 630). For example, the extended reality device (e.g., using processor 320, memory 330, storage component 340, input component 350, output component 360, communication interface 370, and/or the like) may determine, based on the image data, that the set of parts includes a first part and a second part that appears to be newer than the first part, as described above.

As further shown in FIG. 6, process 600 may include rendering, on a display of the extended reality device, digital content to visually indicate that the second part appears to be newer than the first part, wherein rendering the digital content may comprise placing the digital content in the coordinate space using the one or more anchor points that correspond to the second part (block 640). For example, the extended reality device (e.g., using processor 320, memory 330, storage component 340, input component 350, output component 360, communication interface 370, and/or the like) may render, on a display of the extended reality device, digital content to visually indicate that the second part appears to be newer than the first part, as described above. In some implementations, rendering the digital content may comprise placing the digital content in the coordinate space using the one or more anchor points that correspond to the second part.

Process 600 may include additional implementations, such as any single implementation or any combination of implementations described below and/or in connection with one or more other processes described elsewhere herein.

In some implementations, the extended reality device may obtain a vehicle history report associated with the vehicle based on an identifier associated with the vehicle, obtain additional digital content based on one or more records in the vehicle history report that relate to one or more repair or maintenance incidents involving the vehicle, and render the digital content in such a way as to visually emphasize the one or more repair or maintenance incidents involving the vehicle.

In some implementations, the digital content may indicate that the second part appears to have been repaired or replaced. In some implementations, the digital content may indicate that the first part appears to need repair or maintenance. In some implementations, the digital content may indicate that the second part appears to be an aftermarket part.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

obtaining, by a device, vehicle image data;

obtaining, by the device, a vehicle history report indicating one or more historical events involving a vehicle depicted in the vehicle image data;

identifying, by the device and based on the vehicle history report, at least one vehicle part associated with at least one historical event of the one or more historical events;

identifying, by the device and based on the vehicle image data and based on the at least one vehicle part, one or more anchor points in a coordinate space, wherein the one or more anchor points correspond to the at least one vehicle part; and rendering, by the device and using the one or more anchor points, digital content in the coordinate space,
the digital content visually emphasizing a particular vehicle part, of the at least one vehicle part, and
the digital content including, for the particular vehicle part, data specifying a corresponding historical event from the at least one historical event.

2. The method of claim 1, wherein:
the digital content visually emphasizes a plurality of vehicle parts, and
the digital content includes, for the plurality of vehicle parts, data specifying a plurality of historical events.

3. The method of claim 1, wherein the digital content includes one or more of:
a patterned overlay,
a colored overlay,
a hologram,
a digital or virtual object,
a textual description,
a visual marker, or
a superimposed graphic.

4. The method of claim 1, further comprising:
obtaining diagnostic data related to the one or more conditions of the vehicle; and
wherein rendering the digital content comprises:
rendering the digital content based on the diagnostic data.

5. The method of claim 1, further comprising:
obtaining model information representing an expected appearance of the vehicle; and
wherein rendering the digital content comprises:
rendering the digital content based on the model information.

6. The method of claim 1, wherein obtaining the vehicle image data comprises at least one of:
obtaining the vehicle image data using one or more sensors;
obtaining the vehicle image data from one or more frames in a video; or
obtaining the vehicle image data from a three-dimensional model representing various surfaces of the vehicle.

7. The method of claim 1, further comprising:
analyzing the vehicle history report to determine, for the particular vehicle part, data indicating a severity of the corresponding historical event; and
wherein rendering the digital content comprises:
rendering the digital content visually emphasizing the particular vehicle part based on the data indicating the severity of the corresponding historical event.

8. A device, comprising:
one or more memories; and
one or more processors communicatively coupled to the one or more memories, configured to:
obtain vehicle image data;
obtain a vehicle history report indicating one or more historical events involving a vehicle depicted in the vehicle image data;
identify, based on the vehicle history report, at least one vehicle part associated with at least one historical event of the one or more historical events;
identify, based on the vehicle image data and based on the at least one vehicle part, one or more anchor points in a coordinate space,
wherein the one or more anchor points correspond to the at least one vehicle part; and
render, using the one or more anchor points, digital content in the coordinate space,
the digital content visually emphasizing a particular vehicle part, of the at least one vehicle part, and
the digital content including, for the particular vehicle part, data specifying a corresponding historical event from the at least one historical event.

9. The device of claim 8, wherein:
the digital content visually emphasizes a plurality of vehicle parts, and
the digital content includes, for the plurality of vehicle parts, data specifying a plurality of historical events.

10. The device of claim 8, wherein the digital content includes one or more of:
a patterned overlay,
a colored overlay,
a hologram,
a digital or virtual object,
a textual description,
a visual marker, or
a superimposed graphic.

11. The device of claim 8, wherein the one or more processors are further configured to:
obtain diagnostic data related to the one or more conditions of the vehicle; and
wherein the one or more processors, when rendering the digital content, are configured to:
render the digital content based on the diagnostic data.

12. The device of claim 8, wherein the one or more processors are further configured to:
obtain model information representing an expected appearance of the vehicle; and
wherein the one or more processors, when rendering the digital content, are configured to:
render the digital content based on the model information.

13. The device of claim 8, wherein the one or more processors, when obtaining the vehicle image data, are configured to at least one of:
obtain the vehicle image data using one or more sensors;
obtain the vehicle image data from one or more frames in a video; or
obtain the vehicle image data from a three-dimensional model representing various surfaces of the vehicle.

14. The device of claim 8, wherein the one or more processors are further configured to:
analyze the vehicle history report to determine, for the particular vehicle part, data indicating a severity of the corresponding historical event; and
wherein the one or more processors, when rendering the digital content, are configured to:
render the digital content visually emphasizing the particular vehicle part based on the data indicating the severity of the corresponding historical event.

15. A non-transitory computer-readable medium storing instructions, the instructions comprising:
one or more instructions that, when executed by one or more processors, cause the one or more processors to:
obtain vehicle image data;
obtain a vehicle history report indicating one or more historical events involving a vehicle depicted in the vehicle image data;
identify, based on the vehicle history report, at least one vehicle part associated with at least one historical event of the one or more historical events;
identify, based on the vehicle image data and based on the at least one vehicle part, one or more anchor points in a coordinate space, wherein the one or more anchor points correspond to the at least one vehicle part; and render, using the one or more anchor points, digital content in the coordinate space,
the digital content visually emphasizing a particular vehicle part, of the at least one vehicle part, and
the digital content including, for the particular vehicle part, data specifying a corresponding historical event from the at least one historical event.

16. The non-transitory computer-readable medium of claim 15, wherein:
the digital content visually emphasizes a plurality of vehicle parts, and
the digital content includes, for the plurality of vehicle parts, data specifying a plurality of historical events.

17. The non-transitory computer-readable medium of claim 15, wherein the digital content includes one or more of:
a patterned overlay,
a colored overlay,
a hologram,
a digital or virtual object,
a textual description,
a visual marker, or
a superimposed graphic.

18. The non-transitory computer-readable medium of claim 15, wherein the one or more instructions, when executed by the one or more processors, further cause the one or more processors to:
obtain diagnostic data related to the one or more conditions of the vehicle; and
wherein the one or more instructions, that cause the one or more processors to render the digital content, cause the one or more processors to:
render the digital content based on the diagnostic data.

19. The non-transitory computer-readable medium of claim 15, wherein the one or more instructions, when executed by the one or more processors, further cause the one or more processors to:
obtain model information representing an expected appearance of the vehicle; and
wherein the one or more instructions, that cause the one or more processors to render the digital content, cause the one or more processors to:
render the digital content based on the model information.

20. The non-transitory computer-readable medium of claim 15, wherein the one or more instructions, that cause the one or more processors to obtaining the vehicle image data, cause the one or more processors to at least one of:
obtain the vehicle image data using one or more sensors;
obtain the vehicle image data from one or more frames in a video; or
obtain the vehicle image data from a three-dimensional model representing various surfaces of the vehicle.

* * * * *